B. S. CURTIS.
PLOW HOLDER.
APPLICATION FILED APR. 21, 1908.

902,380.

Patented Oct. 27, 1908.

2 SHEETS—SHEET 1.

Inventor
Burtille S. Custis.

Witnesses
F. C. Gibson.
John F. Byrne.

By Victor J. Evans
Attorney

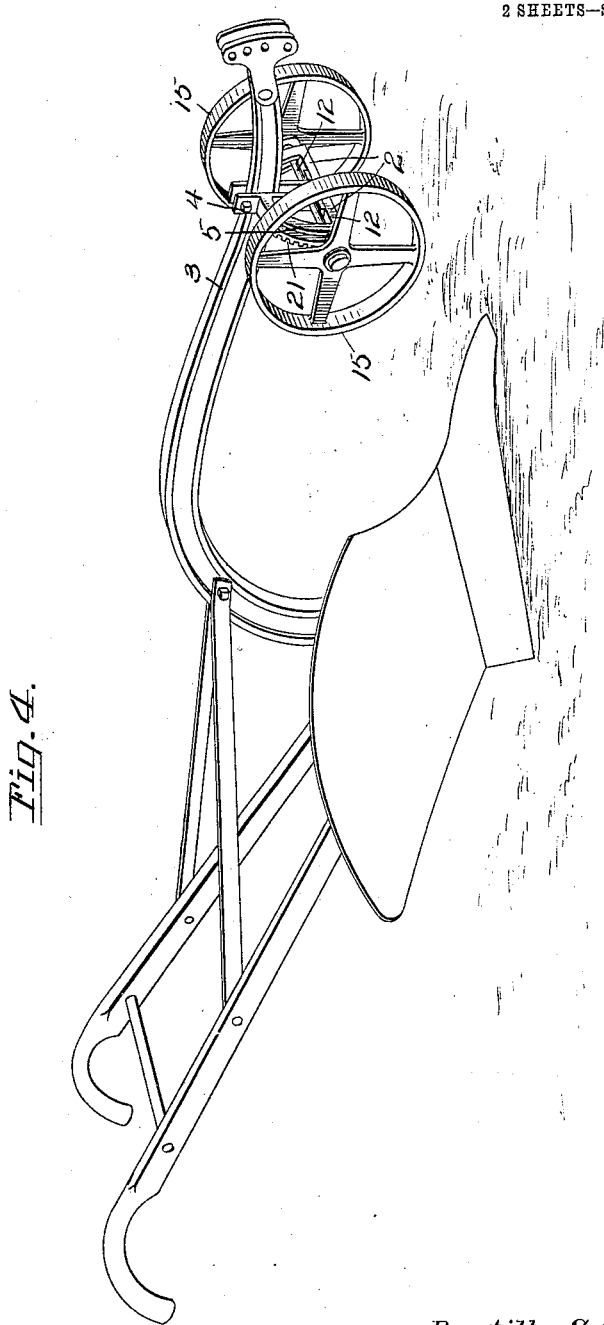

UNITED STATES PATENT OFFICE.

BURTILLE S. CURTIS, OF DEXTER, MAINE.

PLOW-HOLDER.

No. 902,380.

Specification of Letters Patent.

Patented Oct. 27, 1908.

Application filed April 21, 1908. Serial No. 428,318.

*To all whom it may concern:*

Be it known that I, BURTILLE S. CURTIS, a citizen of the United States of America, residing at Dexter, in the county of Penobscot and State of Maine, have invented new and useful Improvements in Plow-Holders, of which the following is a specification.

My invention relates to improvements in plow attachments for walking plows, and its primary object is the provision of a device which is adapted for application to the forward end of a plow beam to hold the plow in the furrow, the device being capable of adjustment to permit the depth of the cut of the plow to be regulated.

A further object of my invention is to provide a plow holder which is simple, durable and efficient, and which can be manufactured and sold at a comparatively low cost.

Figure 1:
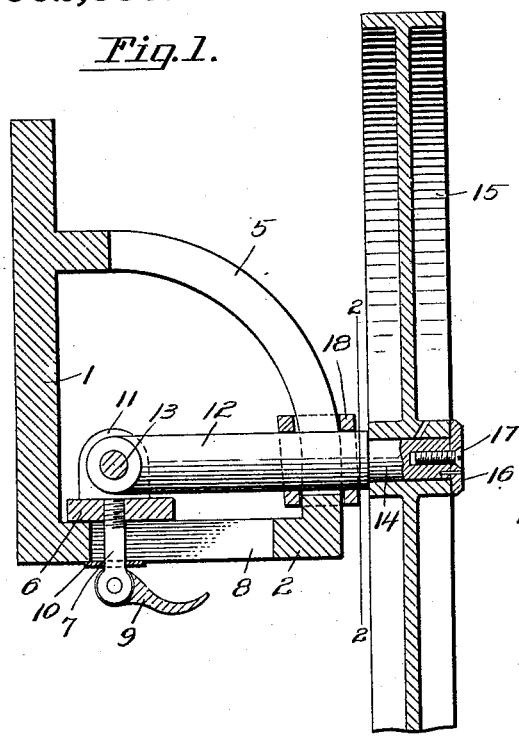
Figure 2:
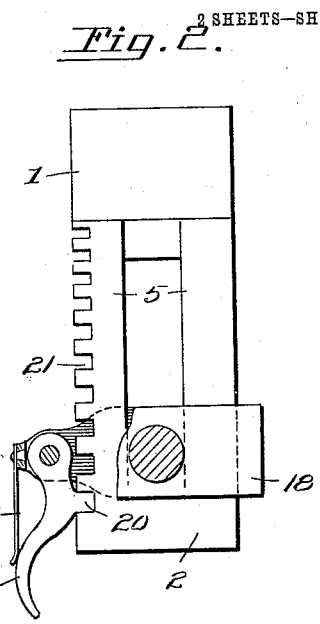
Figure 3:
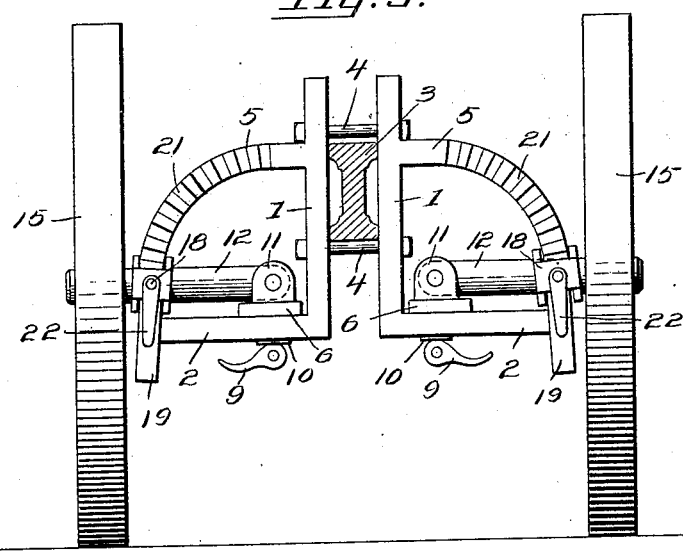

With the above and other objects in view, the invention consists in the construction, combination and arrangement of parts hereinafter fully described, claimed and illustrated in the accompanying drawing, wherein:

Figure 1 is a sectional view taken on a plane extending vertically and centrally through one-half of my improved plow holder. Fig. 2 is a sectional view taken on a plane indicated by the line 2—2 of Fig. 1. Fig. 3 is a plan view illustrating the application of the plow holder. Fig. 4 is a perspective view illustrating the application of the plow holder.

Referring to the drawing by reference numerals, 1 designates the vertical, and 2 the horizontal members of a pair of angle brackets which are secured to the forward end of the beam 3 of a walking plow by means of bolts 4. The bolts 4 pass through the vertical members 1 of the brackets, and one bolt is disposed above and the other below the plow beam. The horizontal members 2 of the brackets project laterally in opposite directions from the plow beam, and each is provided with a pair of relatively spaced curved arms 5. The arms 5 extend from the outer end of the members 2 to a point adjacent the upper end of the members 1. Pivot blocks 6 are mounted upon the members 2 for adjustment longitudinally thereof, that is, the pivot blocks are mounted for adjustment in opposite directions laterally of the plow beam 3. The pivot blocks are secured in applied position by means of bolts 7 which are threaded into the blocks and which pass through slots 8 formed in and extending longitudinally of the horizontal members 2 of the brackets. The pivot blocks 6 are adapted to be secured in adjusted position by means of cams 9 which are pivotally mounted upon the bolts 7. The cams 9 are adapted to force plates 10 into frictional engagement with the under surface of the horizontal members 2 of the brackets, said plate being loosely mounted upon the bolts 7 between the cams 9 and said members.

A pair of relatively spaced ears 11 is secured to and rises vertically from each of the pivot blocks 6. Shafts 12 are each pivotally mounted between the ears 11 on bolts 13, which pass through the ears and through the shafts. The free end of each shaft 12 is disposed between each pair of arms 5 and is formed to provide a journal 14. Wheels 15 are rotatably mounted upon the journals 14, and are secured in applied position by means of a plate 16 and screws 17, the screws 17 passing through the plate and entering the journals. The free ends of the shafts 12 also pass through bearings in blocks 18 which are adjustably mounted upon the arms 5. One side of each bearing block is projected longitudinally in one direction to permit a dog 19 to be pivotally mounted thereon. The dogs 19 are provided with lugs 20 which are adapted to engage one of a plurality of notches 21 formed on the arms 5. The dogs 19 are held in position to retain the lugs 20 in the notches 21 by means of leaf springs 22, each of which is secured at one end to each of the bearing blocks 18, the free ends of the springs bearing on the dogs 19.

The device is adapted to hold the plow in the furrow and to regulate the depth of the cut of the plow. When it is desired to regulate the depth of the cut of the plow, the bearing blocks 18 are adjusted on the arms 5, the blocks being held in their adjusted position by means of the dogs 19. When it is desired to increase the distance between the wheels 15, the pivot blocks 6 are adjusted upon the members 2, said blocks being held in adjusted position by means of the cams 9.

From the foregoing description taken in connection with the accompanying drawing, the construction and mode of operation of the invention should be understood without a further extended description.

Changes in the form, proportions and minor details of construction may be made within the scope of the claims without departing from the spirit or sacrificing any of the advantages of the invention.

Having fully described and illustrated my invention, what I claim is:

1. A plow holder comprising a bracket, a pivot block adjustably mounted upon the bracket, a shaft pivotally mounted on the block, means for securing the shaft in adjusted position and a wheel journaled on the shaft.

2. A plow holder comprising a bracket, a pivot block adjustably mounted upon the bracket, a shaft pivotally mounted on the block, a bearing block adjustably mounted on the bracket, said shaft passing through the bearing of the block, and a wheel journaled on the shaft.

3. A plow holder comprising a bracket, a pivot block adjustably mounted on the bracket, a shaft pivotally mounted on the block, an arm provided with notches, a bearing block adjustably mounted on the arm, the shaft passing through the bearing of the block, and a dog pivotally mounted upon the bearing block for engagement in one of said notches.

4. A plow holder comprising a bracket provided with an elongated slot, a pivot block, a bolt carried by the pivot block and passing through the slot, a cam mounted upon the bolt for engagement with the bracket, a shaft pivotally mounted upon the block, means for securing the shaft in adjusted position and a wheel journaled on the shaft.

In testimony whereof I affix my signature in presence of two witnesses.

BURTILLE S. CURTIS.

Witnesses:
   EDWARD J. McKENNEY,
   EDWARD C. GREELEY.